United States Patent [19]
Gaillard

[11] Patent Number: 6,081,585
[45] Date of Patent: Jun. 27, 2000

[54] INTERACTIVE CONTROL ELECTRONIC DIRECTORY

[75] Inventor: Jean-Pierre Gaillard, Paris, France

[73] Assignee: France Telecom, Paris, France

[21] Appl. No.: 08/815,741

[22] Filed: Mar. 12, 1997

[30] Foreign Application Priority Data

Mar. 21, 1996 [FR] France ................................ 96 03515

[51] Int. Cl.⁷ ................................................. H04M 11/00
[52] U.S. Cl. ........................................ 379/93.23; 379/354
[58] Field of Search ................. 379/90.01, 93.05–93.07, 379/93.17–93.23, 110.01, 354–357

[56] References Cited

U.S. PATENT DOCUMENTS

| | | | |
|---|---|---|---|
| 4,885,580 | 12/1989 | Noto et al. | 379/93.19 |
| 5,329,506 | 7/1994 | Kitta et al. | 379/356 |
| 5,457,738 | 10/1995 | Sylvan | 379/354 |

FOREIGN PATENT DOCUMENTS

| | | | |
|---|---|---|---|
| 0526729 | 2/1993 | European Pat. Off. | 379/93.23 |
| 2476347 | 8/1981 | France . | |
| 3425841 | 1/1986 | Germany . | |
| 3606733 | 9/1987 | Germany . | |
| 3900364 | 7/1989 | Germany . | |
| 2267414 | 12/1993 | United Kingdom | 379/93.23 |

*Primary Examiner*—Wing F. Chan
*Attorney, Agent, or Firm*—Pearne, Gordon, McCoy & Granger LLP

[57] ABSTRACT

Electronic directory comprising:
- a data base (16) with at least one file (18*a*, 18*b*, 18*c*), each file having informations corresponding to alphanumeric characters and respectively associated with a plurality of references of the directory,
- at least one input interface (22*a*, 22*b*) on which a user can enter at least one alphanumeric character for locating a reference,
- at least one processor (20) for selecting in at least one file references having each acquired alphanumeric character and
- at least one output interface (26*a*, 26*b*) for transmitting to the user the informations associated with each selected reference.

9 Claims, 1 Drawing Sheet

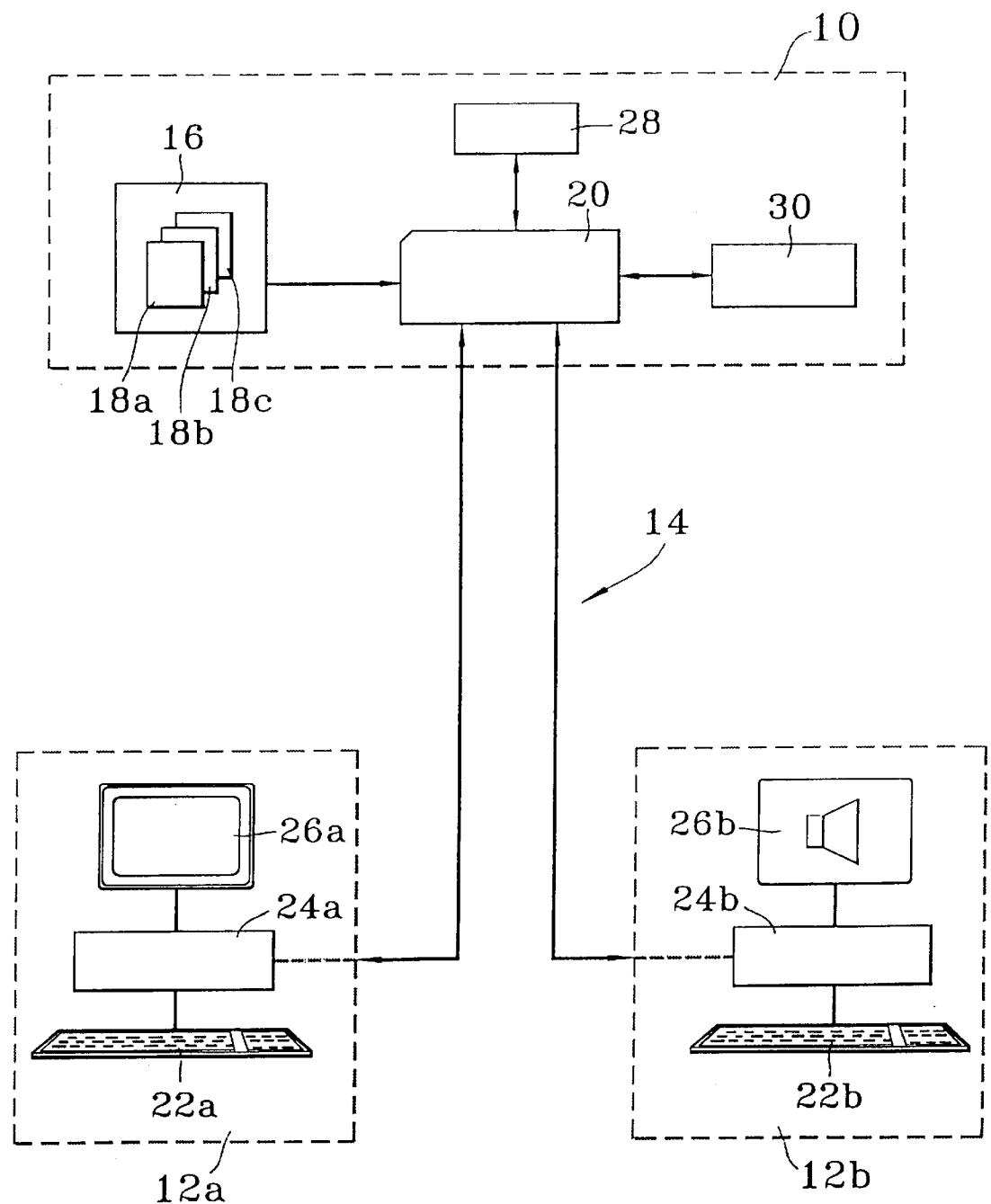

INTERACTIVE CONTROL ELECTRONIC DIRECTORY

DESCRIPTION

1. Technical Field

The present invention relates to an interactive control electronic directory.

The invention has applications either on private telephone networks, or as a service offered to subscribers to the public telephone network. The directory according to the invention can also be simply integrated into a communication terminal, such as e.g. a Minitel-type modem or a telephone.

2. Prior Art

The increase in the length of call numbers to be dialled, which can represent ten digits or more, requires on the part of the user of telephone and communication networks an ever increasing effort of memory in order to obtain his correspondent or the service which he requires.

In order to facilitate the memorizing of call numbers, a certain number of telecommunication equipments have an abbreviated dialling system. This e.g. consists of an abbreviated dialling on telephones permitting the storage of about ten or a few dozen call numbers.

Public telephones also permit an abbreviated dialling by the use of a specially adapted directory card. Abbreviated dialling is also available in the form of a list of references or correspondents on Minitel 12-type modems.

The known systems for storing and locating numbers can be equipped with a "navigator", i.e. a cursor in the form of an arrow moving along a list displayed on a screen. This system makes it possible to select an entry, i.e. the coordinates of a correspondent or subscriber, by means of an alphanumeric criterion such as e.g. the surname of said correspondent or subscriber.

The aforementioned number location and memory assistance systems suffer from a certain number of limitations and do not always make it possible to solve the call number problem, particularly with the increase in the number of communication peripherals.

For example, only a relatively small quantity of numbers can be stored on conventional communication peripherals, such as the telephone. The quantity of numbers is limited not only by the storage capacity of the equipments in question, but also and more particularly by the capacity of the user to memorize a large number of codes of an abbreviated dialling system, even if they have a small number of digits.

The problem of memorizing abbreviated dialling codes occurs in a particularly acute manner when the memory of the communication peripheral is erased as a result of a supply fault due e.g. to a used battery. In this case it is either necessary to reprogram the memory with codes, in a perfectly identical manner, or attempt to remember even evolutions of the memory programming.

A problem also occurs with the increase in the number of communication peripherals. The user often has a plurality of communication devices in his home, the office, the car, etc. When each of these has its own directory of abbreviated numbers, it becomes virtually impossible to form the link between the different correspondents or services and their respective abbreviated number on each device.

Another difficulty is linked with the change to numbers as a result of the geographical location from where a call is made. Thus, a stored call number, valid for a call from a correspondent from a given country, can no longer be used in another country, due to prefixes or other codes which must be added thereto.

Moreover, the aforementioned navigator-based systems, which admittedly make it possible to store a relatively long list of numbers, do not give easy access to the informations stored.

Thus, the numbers are classified according to a single classification, generally in the alphabetical order of the associated services or correspondents. Thus, if the list of references is long and the user does not accurately remember the alphanumeric access criterion, e.g. the surname of the correspondent, the location of a number can be fastidious or even impossible.

Thus, despite existing aids to memory, the user must make a considerable effort to remember the call codes or numbers of his correspondents. This effort is made even greater when a number is only rarely required.

One object of the present invention is to propose an electronic directory making it possible to overcome the aforementioned difficulties.

Another object is to permit the centralized management of the call numbers of correspondents and services requested by one or more users.

Another object is to permit a rapid and easy access to the information or sought number, no matter what the geographical location of the call.

Another object is to enable the user to find a directory reference on the basis of even partial recollections concerning the number, correspondent or associated service.

Yet another object is to propose a single directory for all the communication peripherals of each user.

DESCRIPTION OF THE INVENTION

In order to achieve the above objects, the invention more specifically relates to an electronic directory comprising:
- a data base with at least one file, each file having informations corresponding to alphanumeric characters and respectively associated with a plurality of references of the directory,
- at least one input interface on which a user can enter at least one alphanumeric character for locating a reference,
- at least one processor for selecting in at least one file references having each acquired alphanumeric character and
- at least one output interface for transmitting to the user the informations associated with each selected reference.

In the sense of the present invention, the term reference is used for a group of informations more particularly including the name of a correspondent, subscriber or service and the call number or numbers associated therewith.

The informations for a reference can also include other indications such as an address, an access code to an E-mail type information network, a computer address, an indication of the function of a person, etc.

In a particular usage of the directory, each file can in particular be associated with one user or one group of users. The file then has all the references used or programmed by the user or users.

According to an advantageous embodiment of the directory, the latter can be equipped with an output interface able to transmit to the user an information inviting him to enter at least one supplementary alphanumeric character on the input interface when a number of selected references exceeds a predetermined number and to transmit to the user said informations associated with the selected references when the number of selected references is equal to or below the predetermined number.

The predetermined number of references is essentially dependent on the display capacity of the output interface and is e.g. between 1 and 10.

These characteristics enable a user to carry out an interactive and intuitive search for a reference.

Initially, the user composes or sets on the input interface one or more alphanumeric characters corresponding to recollections which he has of the sought reference. These are e.g. the first name of a correspondent, the start of his telephone number, etc. When the number of references stored including these characters is small, all the references can be displayed on the output interface.

This is the most frequently encountered case. It is based on the fact that among the numbers and surnames of persons composing a particular directory there are few redundant elements. The acquisition of only three or four alphanumeric characters generally makes it possible to extract the sought reference.

If in a particular case a large number of references have the same characters composed by the user, the acquisition of one or more supplementary characters makes it possible to limit the list of displayed references.

Preferably, the processor can be programmed in such a way that, when the user enters a series of one or more characters, the processor selects the references including the series of characters in the order in which it is composed.

However, it should be stressed that the user can enter one or more characters or one or more alphanumeric character strings, each constituted by at least one random character, and this can take place in any random order with respect to the references of the data base. Moreover, the string or strings entered by the user have an arbitrary position relative to the alphanumeric characters of the corresponding string or strings found in the base.

The following table I gives an example of a file having only four references. In the example of table I, the references include the surnames of persons or services and their telephone number. Certain references also indicate the function of persons, their company and other call numbers (E-mail, IP).

Throughout the remainder of the text, reference is made to table I for illustrating the different possibilities of a directory according to the invention.

Once again for illustration purposes, the acquisition of the characters "FT" makes it possible to select lines 1 and 2 of the file corresponding to table I.

The selected references are displayed and the user can then choose to dial a call number of one of these lines with an adapted validation control.

Imagining that a large number of references have the characters "FT" and that the number of selected lines becomes excessive, the user is invited to enter supplementary characters. He can e.g. enter all or part of the surname "DUPOND", and this can take place in a random order.

The directory according to the invention also enables a user to seek a reference on the basis of links existing between different references.

For example, if a user remembers the root "0700" of the call number of one of the persons in a company, he dials these characters and line 2 of table I is displayed. On the basis of this, he can choose to dial "FT" in order to select all the references in the directory corresponding to persons in company "FT".

The electronic directory according to the invention can be a local directory integrated directly into a telephone or any other computer peripheral terminal. However, according to a special aspect of the invention, the directory can have a central server including the data base and at least one terminal including the acquisition and output interfaces. The terminal or terminals are connected to the central server by a telecommunication network. The server and each terminal have teleloading means for transferring informations from files selected by the user from the central server to each terminal.

As a result of the central server, the user can consult his directory on the basis of a plurality of communication terminals located at different geographical locations.

Moreover, through using a central server, a single directory can be used by a large number of persons. It is thus possible to create a subscriber network to said directory. All the references of the directory are then centralized in a single data base. This measure not only avoids a single reference occurring several times in the directory, but also reduces the access time to the information.

According to a particular embodiment of the directory, the central server includes the processor for selecting the references. Thus, the user transmits to the central server the alphanumeric characters for the search, by means of the telecommunication network and using the terminal thereof

TABLE I

| | SURNAME | NUMBER | FIRST NAME | COMPANY | FUNCTION | E-MAIL | IP ADR. |
|---|---|---|---|---|---|---|---|
| 1 | DUPOND | 1 46 29 43 46 | Michel | FT | com. eng. | DUPOND@ISSY.CNET.FR | 139.100.1.85 |
| 2 | DUPOND | 07 00 23 42 | | FT | | | |
| 3 | DUPONT | 44 55 46 98 | | DRI | inspector | | |
| 4 | HERGO | 64 89 75 32 | Jim | | | | 192.144.5.19 |

The acquisition of the characters "4346" makes it possible to extract from the file indicated in table I the first line, which is the only one containing all these characters in this order. These characters form the termination of the telephone number. The acquisition of the characters "0700" would have made it possible to select the second line in which these characters correspond to the root of the telephone number.

and, when the reference or references corresponding to the acquired characters are found, the central unit transfers to the terminal solely the informations from the file corresponding to the selected references.

According to a variant, the central server does not contain the selection processor. Such a processor is then installed in each terminal. The informations concerning a complete display selected by the user are then transferred to the peripheral terminal. The search for one or more references containing the acquired characters then takes place locally in each terminal.

Each user can have on the server a file which is a partial, personal copy of the data base, corresponding to the numbers of his correspondents which are most frequently called.

The file of each use can be updated by adding to it a reference whenever the user dials the number of a reference of the central data base not appearing in his file. The references can also be deleted if a corresponding number is not dialled for a certain time.

A system for the updating of files of users can also be programmed so as to only keep in the files references selected with a frequency exceeding a predetermined frequency. It is consequently possible to eliminate references selected e.g. less than once per year.

In order to control access to a telephone directory with a central server of the type described, said server can have authentication means for each user. Said authentication means can e.g. consist of a digital code key. Thus, before consulting the directory, each user must dial an access code.

According to another advantageous aspect of the invention, the directory can be equipped with a system for converting informations from the files as a function of the geographical location of the terminal on the basis of which the directory has been consulted.

The conversion system more particularly makes it possible to add to the call numbers of the references the prefixes necessary for reaching the correspondent. The prefixes are then adapted as a function of the geographical location from where the call is made, i.e. in the present case the geographical location from where the directory is consulted.

As a result of this measure, a user can consult the directory and obtain the number to be dialled no matter what the geographical location from which he wishes to reach a correspondent.

The characteristics and advantages of the invention can be better gathered from the following description of non-limitative embodiments and with reference to the single drawing attached.

BRIEF DESCRIPTION OF THE DRAWING

The single drawing diagrammatically shows elements of an electronic directory according to the invention in a particular embodiment thereof.

DETAILED DESCRIPTION OF EMBODIMENTS OF THE INVENTION

As shown in the single drawing, the directory has a central server 10 connected to a plurality of communication terminals 12a, 12b by a telecommunication network 14. In a memory, the central server 10 includes a data base 16 having a plurality of files 18a, 18b, 18c.

The data base contains all the references of the user or users of the directory. As stated hereinbefore, this e.g. consists of a plurality of informations including the surnames of correspondents, subscribers or services, their call numbers or access addresses and optionally further complimentary indications.

The references are distributed in files 18a, 18b, 18c, each associated with a particular user. One or more files can also be common to several users.

In the illustrated embodiment, the central server 10 also includes a processor 20 for seeking references.

The alphanumeric characters acquired on a keyboard 22a, 22b of a communication terminal are transferred by means of a modem 24a, 24b and by means of the network 14 to the processor of the central server.

The processor 20 then seeks in the data base and in particular in a file selected by the user, the references having the acquired alphanumeric characters. The informations concerning these references are then transferred to the calling terminal by means of the network 14. These informations are transmitted via the modem 24a, 24b to a terminal output interface 26a, 26b.

The output interface can be a display screen 26a, which is the case for the terminal 12a in the drawing. In this case, the informations corresponding to the selected references are displayed on the screen 26a. For example using a cursor displaceable on the screen, the user can choose the call number which he wishes to dial and which is then automatically dialled by an automatic dialler of the terminal.

The output interface can also have a loudspeaker-based acoustic system 26b, as for the terminal 12b in the drawing. For this purpose the central server has a sound synthesizer 28 and transmits to the terminal 12b signals corresponding to a voice message. This voice message is restored by the acoustic system of the output interface 26 and more particularly contains selected reference informations.

As a result of this feature, the server 10 can be interrogated from a telephone.

The central server 10 also has a programmed conversion system 30 which, as a function of the geographical origin of a directory consultation call, makes it possible to transmit a plurality of references, e.g. a file, by adding to the call numbers of each reference a particular indicative number.

As stated hereinbefore, the conversion 30 can in particular add to the numbers the access code to the country or geographic region of the address of a correspondent, as from the country from where the directory is consulted. An information containing the indication of the country or geographical region of the calling terminal must then be transmitted to the central server 10.

This can take place by inviting the user to identify the country or call region. The operation can also be automatic with a transfer to the central server of the calling telephone number.

The central server can also be equipped with authentication means for each user. The user must e.g. dial a code individual to him and giving him access to one or more directory files.

Finally, as a result of the central server, a user can consult the directory no matter what the call location, namely his office within the company, his main residence, a secondary residence, his car, etc. without any effort being necessary to memorize codes or abbreviated numbers of his correspondents.

According to a simplified embodiment of the invention, all the elements of the electronic directory, i.e. the data base 16, processor 20 and interfaces, can be grouped within a single apparatus. Such an apparatus does not offer the advantages of the central server-equipped device described hereinbefore, but still allows a simplified, interactive search of call numbers of correspondents in accordance with the present invention.

What is claimed is:

1. Electronic directory comprising:
   a data base with at least one file, each file having informations corresponding to alphanumeric characters and respectively associated with a plurality of references of the directory, at least one input interface on which a user can enter at least one alphanumeric character, in any order, for locating a reference, at least one processor for selecting, in at least one file, references having each acquired alphanumeric character in any order and at any position within said references and at least one output interface for transmitting to the user the informations associated with each selected reference, the output interface being able to transmit to the user an information inviting him to enter at least one supplementary alphanumeric character on the input interface when a number of selected references exceeds a predetermined number and to transmit to the user said informations associated with the selected references when the number of selected references is equal to or below the predetermined number.

2. Directory according to claim 1, characterized in that the output interface has an alphanumeric display screen.

3. Directory according to claim 1, characterized in that the output interface has an acoustic system for transmitting informations in sound form.

4. Directory according to claim 1, characterized in that it has a central server including the data base and at least one terminal incorporating input and output interfaces and connected to the central server by a telecommunication network, the server and each terminal having teleloading means for transferring informations from files selected by the user from the central server to each terminal.

5. Directory according to claim 4, characterized in that the central server also includes the reference selection processor.

6. Directory according to claim 4, characterized in that each interface has a reference selection processor.

7. Directory according to claim 4, characterized in that the central server has authentication means for each user.

8. Directory according to claim 4, characterized in that it includes a system for converting informations as a function of the geographical location of each terminal.

9. Electronic directory according to claim 1, characterized in that it incorporates a system for updating files associated with at least one user, in order to only retain in the files references which the user selects with a frequency exceeding a predetermined frequency.

* * * * *